United States Patent
Lopez et al.

(10) Patent No.: US 10,518,898 B2
(45) Date of Patent: Dec. 31, 2019

(54) COMMUNICATION SYSTEM AND METHOD FOR AN AIRCRAFT CARGO/FREIGHT HANDLING SYSTEM

(71) Applicant: Goodrich Corporation, Charlotte, NC (US)

(72) Inventors: Daniel Diaz Lopez, Cork (IE); Piyush Agrawal, Cork (IE); Raymond Foley, Cork (IE); William A. Veronesi, Hartford, CT (US); Scott Harms, Ypsilanti, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 837 days.

(21) Appl. No.: 15/153,949

(22) Filed: May 13, 2016

(65) Prior Publication Data

US 2017/0327242 A1    Nov. 16, 2017

(51) Int. Cl.
| | | |
|---|---|---|
| *B64D 47/00* | (2006.01) | |
| *H02M 1/44* | (2007.01) | |
| *H02M 7/04* | (2006.01) | |
| *H02M 7/44* | (2006.01) | |
| *H04L 12/28* | (2006.01) | |

(52) U.S. Cl.
CPC .......... *B64D 47/00* (2013.01); *H02M 1/44* (2013.01); *H02M 7/04* (2013.01); *H02M 7/44* (2013.01); *H04L 2012/2843* (2013.01)

(58) Field of Classification Search
CPC ......... B64D 47/00; H02M 1/44; H02M 7/04; H02M 7/44; H04B 3/548; H04B 2203/547; H04B 2203/5491

USPC .......................................... 307/9.1; 370/276
See application file for complete search history.

(56) References Cited

U.S. PATENT DOCUMENTS

| | | | | |
|---|---|---|---|---|
| 5,886,619 | A | * | 3/1999 | Takasan ............. B61L 3/18 104/297 |
| 7,580,777 | B2 | | 8/2009 | Smith et al. |
| 7,598,625 | B2 | | 10/2009 | Yu et al. |
| 8,816,830 | B2 | | 8/2014 | Lai et al. |
| 8,907,521 | B2 | | 12/2014 | Guillot et al. |
| 9,306,625 | B2 | | 4/2016 | Lee |
| 2006/0056207 | A1 | * | 3/2006 | Sarlioglu ........... H02M 1/126 363/44 |
| 2008/0112473 | A1 | | 5/2008 | Refaeli et al. |
| 2009/0103642 | A1 | * | 4/2009 | Galli .................. H04B 3/54 375/260 |

(Continued)

OTHER PUBLICATIONS

European Search Report, European Application No. 17160197.4, dated May 31, 2017, European Patent Office; EP Search Report 7 pages.

*Primary Examiner* — Tomi Skibinski
(74) *Attorney, Agent, or Firm* — Cantor Colburn LLP (57) ABSTRACT

Systems for exchanging information between a cargo handling system of an aircraft and a Power Drive Unit (PDU) are described herein. The systems include a power source provided within the aircraft and a first PDU provided within the aircraft. The power source is capable of providing DC power to the at least one PDU via an electrical power line. The power source further including a first Power Line Communication (PLC) node and the PDU further including a second Power Line Communication (PLC) node. The first PLC node being capable of communicating with the second PLC node via the electrical power line.

13 Claims, 3 Drawing Sheets

(56) References Cited

U.S. PATENT DOCUMENTS

| | | | |
|---|---|---|---|
| 2009/0323969 A1* | 12/2009 | Nishi | H04J 13/00 380/281 |
| 2011/0071705 A1* | 3/2011 | Matuszeski | B64C 39/024 701/3 |
| 2011/0134976 A1* | 6/2011 | Fossion | H04B 3/548 375/222 |
| 2013/0213744 A1 | 8/2013 | Foley | |
| 2014/0049099 A1 | 2/2014 | Sampigethaya et al. | |
| 2014/0319115 A1 | 10/2014 | Altay | |
| 2015/0123644 A1* | 5/2015 | You | H04B 3/56 323/355 |
| 2015/0321768 A1 | 11/2015 | Kumar et al. | |

* cited by examiner

COMMUNICATION SYSTEM AND METHOD FOR AN AIRCRAFT CARGO/FREIGHT HANDLING SYSTEM

TECHNICAL FIELD

Communication systems and methods of communicating and exchanging information are described herein. The communication systems and methods may be used in an aircraft such as an aircraft having a cargo handling system.

BACKGROUND

Communication systems in aircrafts generally rely on industrial communication standards for applications such as sensors and actuators. The oldest and most predominant avionics data bus is sometimes known as ARINC429. Aeronautical Radio INC (ARINC) 429 is a digital information/data transfer system which has been the technical standard for aircraft avionics and has been used on most higher-end commercial and transport aircraft. This uses a self-clocking, self-synchronising data bus protocol. The connection wires comprise twisted pairs carrying balanced differential signaling.

MIL-STD-1553 is a military standard serial data bus that was published by the United States Department of Defence and although it was originally designed as an avionic data bus for use with military avionics, it has since been commonly used in spacecraft on-board data handling (OBDH) subsystems in both military and civil aircrafts.

ARINC 825 is the general standardisation of controller area networks (CAN) for airborne use and is used to transmit data to sensors and actuators.

ARINC 664—AFDX uses a data network based on Ethernet and is known as Avionics Full-Duplex Switched Ethernet (AFDX). This data network has been generally used for safety-critical applications and utilises dedicated bandwidth.

ARINC 818—ADVB is the use of digital video transmission in avionics and is known as Avionics Digital Video Bus (ADVB). This is a video interface and protocol standard that was developed for high bandwidth digital video and audio transmission in avionic systems.

These known types of communication systems for use in an aircraft are generally robust and require the use of additional cabling within the system. This wiring that is dedicated for communication is often bundled in together with separate power lines and so therefore often requires additional protection from the power lines.

SUMMARY

A system for sending a signal between a power source and a Power Drive Unit (PDU) of a cargo system of an aircraft is described herein comprising a power source provided within said aircraft, a first PDU provided within said aircraft, said power source being capable of providing DC power to said at least one PDU via an electrical power line; said power source further comprising a first Power Line Communication (PLC) node; said PDU further comprising a second Power Line Communication (PLC) node; said first PLC node being capable of sending said signal between said first PLC node and said second PLC node via said electrical power line.

In any of the examples described herein the signal may comprise information. The information may comprise command information, commanding the PDU to actuate a load. The information may comprise health status information of the PDU.

In any of the examples described herein, the power supply may provide power to a cargo system. The cargo system may comprise PDUs that are provided within said aircraft and connected to the power supply. The PDUs may be used to move the cargo and load it onto and off the aircraft.

The electrical part of the cargo system may be connected to the power supply and may also have loads connected to it. In some examples, the loads may comprise a PDU or PDUs.

In any of the examples described herein, the first PLC node may comprise a first PLC sub-circuit; and said second PLC node may comprise a second PLC sub-circuit, and said first and second PLC sub-circuits may comprise a PLC Modem connected to an analogue front end (AFE).

The AFE may further comprise a protection circuit and coupling capacitors and the modem may be connected to said protection circuit, and said protection circuit may be connected, via said capacitors, to said power line.

In any of the examples described herein, the power line may comprise first and second power wires and one of the capacitors may be connected to each of the power wires.

The AFE complies with DO-160 the requirements for said aircraft.

In any of the examples described herein, the PDU may comprise a motor, a DC/AC power inverter, a DC EMI filter and an input connector and the motor may be connected to said DC/AC power inverter. The DC/AC power inverter may be connected to said DC EMI filter 52 and the DC EMI filter may be connected to said power line via said input connector.

In any of the examples described herein, the second PLC node that is located in said PDU may be connected to said power line at the PDU input connector.

In any of the examples described herein, the power supply may be connected to an AC input source and wherein the power supply may comprise an AC filter, a rectifier stage, a DC filter and an output connector. The AC filter may be capable of receiving an AC current from said AC input source and the AC filter may be connected to said rectifier stage. The rectifier stage may be connected to said DC filter and said DC filter may be connected to said power line via said output connector.

In any of the examples described herein, the first PLC node may be located between said DC filter and said connector.

In any of the examples described herein, the first node may be located within the power source and may be capable of sending a command signal to the second node that is located in the PDU, to actuate said PDU.

In any of the examples described herein, the communication may be bidirectional and the second node that is located within the PDU may be capable of sending a return signal back to the first node that is located within the power source.

In any of the examples described herein, the system may comprise a plurality of said PDUs and the first PLC node may be capable of individually communicating via said power line with each of said plurality of PDUs.

In any of the examples described herein, the power line may comprise a plurality of branches and at least one of said branches may comprise at least one PDU.

In any of the examples described herein, the power line may comprise a plurality of branches and at least one of said branches may comprise a plurality of said PDUs.

In any of the examples described herein, the power line may comprise a plurality of branches and a plurality of said branches may comprise at least one of said PDUs.

In any of the examples described herein, the system may be used in an aircraft and may be used as part of a cargo system of an aircraft.

A method for sending a signal between a power source and a Power Drive Unit (PDU) of a cargo system on an aircraft is also described herein; said method comprising:

connecting a first Power Line Communication (PLC) node to said power source;

connecting a second Power Line Communication (PLC) node to said PDU; and providing DC power from said power source to said at least one PDU via an electrical power line; said first PLC node being capable of communicating with said second PLC node via said electrical power line, and sending said signal between said first PLC node and said second PLC node via said electrical power line.

The method may further comprise providing a first PLC sub-circuit in said first PLC node and providing a second PLC sub-circuit in said second PLC node and may further comprise providing a PLC modem connected to an analogue front end (AFE) in each of said PLC sub-circuits, wherein said AFE comprises: a protection circuit and coupling capacitors; and said method further comprising connecting said modem to said protection circuit and connecting said protection circuit to said power line via said capacitors.

The power line may further comprise first and second power wires and the method may further comprise connecting one of said capacitors to each of said power wires.

The AFE used in the methods described herein may comply with DO-160 the requirements for said aircraft.

The method may further comprise providing a motor, a DC/AC power inverter; a DC EMI filter; and an input connector in said PDU. The method may further comprise connecting said motor to said DC/AC power inverter, connecting said DC/AC power inverter to said DC EMI filter and connecting said DC EMI filter to said power line via said input connector.

In any of the examples described herein, the method may comprise connecting said second PLC node to said power line at said PDU input connector.

The method may further comprise providing an AC filter, a rectifier stage and a DC filter in said power supply and connecting said power supply to the AC input source. The AC filter may be capable of receiving an AC current from said AC input source; and the method may further comprise connecting said AC filter to said rectifier stage, connecting said rectifier stage to said DC filter and connecting said DC filter to said connector.

The method may further comprise providing said first PLC node between said DC filter and said connector.

The method may further comprise the first node within the power source and sending a command signal from said first node to the second node that is located in the PDU, to actuate said PDU.

In any of the methods described herein, the method may comprise sending bidirectional signals. In some examples, the second node that is located within the PDU sends a return signal back to the first node that is located within the power source.

In any of the methods described herein, a plurality of PDUs may be provided and the first PLC node may individually communicate via said power line with each of said plurality of PDUs.

In any of the methods described herein, the power line may comprise a plurality of branches and at least one of said branches may comprise at least one PDU.

In any of the methods described herein, the power line may comprise a plurality of branches and at least one of said branches may comprise a plurality of said PDUs.

DETAILED DESCRIPTION

The examples described herein with reference to FIGS. 2 to 7 describe the implementation of a communication system within an aircraft and in particular that may be used with a cargo handling system of an aircraft having a cargo loading/unloading system. Specifically, the examples described with reference to FIGS. 2 to 7 implement power line communications (PLC) in a cargo system in a cargo handling system of an aircraft. This provides significant advantages over known communication systems for aircraft and in particular cargo handling system on an aircraft.

Figure 1:
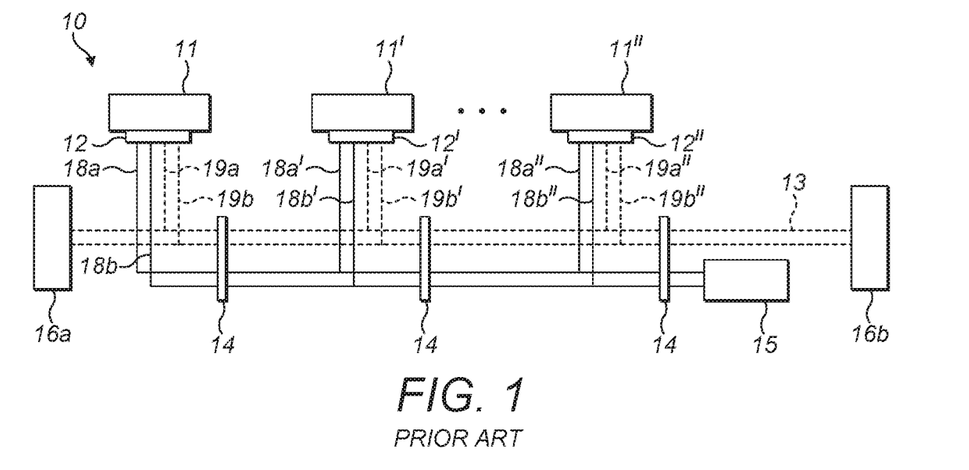
FIG. 1 depicts a block diagram of an example of a known type of communication system for a cargo handling system on an aircraft.

An example of a known type of communication system for a cargo handling system of an aircraft 10 is shown in FIG. 1.

In the known cargo system 10, the system may comprise a plurality of power drive units (PDUs), 11, 11', 11" for moving cargo and loading and unloading cargo containers into and out of the aircraft. An input connector 12, 12', 12" including CAN (CAN_Hi, 19a, and CAN_Lo, 19b) and power wires (DC+, DC− and ground wires) connects the circuitry of each of the PDUs to a plurality of wires including power wires 18a, 18b, 18a', 18b', 18a", 18b" and communication wires 19a, 19b, 19a', 19b', 19a", 19b". Specifically, in the example of a known system shown FIG. 1, each PDU 11, 11', 11" is connected to two communication wires 19a, 19b, 19a', 19b', 19a", 19b". The communication wires form a CAN communications bus 13 which has different branches to the PDUs, the CAN bus extending between a CAN node 16b and a termination 16a. Two power wires 18a, 18b, 18a', 18b', 18a", 18b" also extend between the input connector 12, 12', 12" of each of the PDUs 11, 11', 11" and the power source 15 (an AC fed rectifier that generates the 270V DC bus). The communication wires run in parallel to the power wires 18a, 18b, 18a', 18b', 18a", 18b" along the length of the system.

As can be seen in FIG. 1, the known system therefore requires dedicated wires and cables for both the communication wires 19 which form the communication bus 13 (comprising CAN communication wires) and the power wires 18. These wires are held in place with wire harnesses 14 which are used to attach the wires properly in the installation of the aircraft. These wire harnesses 14 can be relatively large in size and number. Relatively large sized connectors must also be used. In addition to this, additional protections must be added onto the communication circuits of the PDUs in case there is a short between the communication and power wires.

Figure 2:
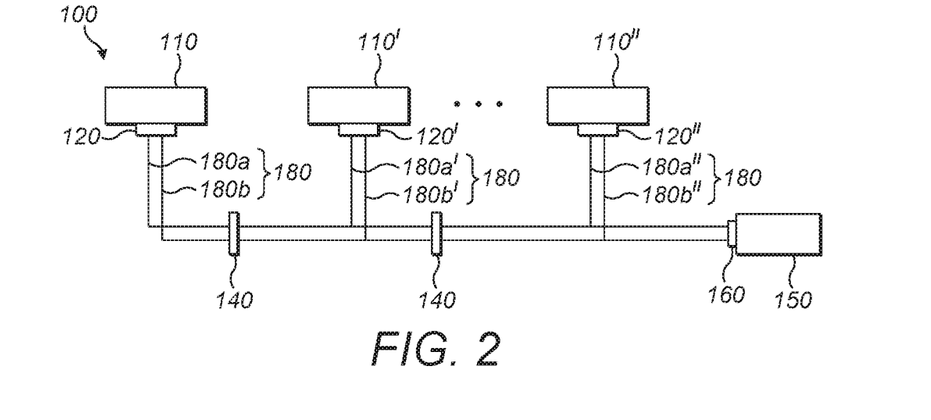
FIG. 2 depicts a block diagram showing an example of a new type of communication system that may be used in a cargo handling system in an aircraft.

An example of a new type of communication system 100 that may be used in an aircraft and, in particular, in a cargo handling system of an aircraft, is shown in FIG. 2. In this example, the communication system utilises power line communications (PLC) instead of the industrial communication systems currently used in known systems.

Powerline communications (PLC) is a technology that has been growing during recent years and has previously been used to provide internet access with current standards having bit rates up to 200 Mbits/s. Although this technology is known for use in houses or buildings, for example, its use for transportation applications is increasing and it is not known to have been implemented for use in a cargo handling system of an aircraft to send signals between a power source located within the aircraft and a power drive unit(s) for moving a load(s) such as loading and unloading cargo containers. Due to the inherent simplification of the communications architecture within the aircraft, the use of PLC in a cargo handling system of an aircraft as described herein has been found to offer great advantages where the weight and size of the aircraft and its components have a big impact on the system.

For the examples described herein and shown in FIGS. 2 to 7, the distributed power supply architecture in the examples of the new system described herein is based on a DC power line with the DC-fed PDUs allocated on the power line in a branched architecture. In FIG. 2, there are three PDUs provided on one of the branches of the system. In other examples, there may be a number of branches of the power line, with at least one, or a plurality of PDUs on each branch. The DC-bus is therefore connected to at least one, or several power drive units (PDUs) 110, 110', 110" for actuating or moving loads such as loading and unloading cargo containers. It is generally more challenging to design a PLC system that has a branched architecture in comparison to systems wherein there is no branching and the system is linear. Due to the unique system design, however, the examples described herein with reference to FIGS. 2 to 7 enable the successful communication of signals between the power source and the PDUs via this branched architecture and provide the advantages described herein. The branched architecture using PLC is depicted in FIG. 2. Although three PDUs are depicted here, any number of PDUs may be present.

Similarly to the known example shown in FIG. 1, in FIG. 2, an input connector 120, 120', 120" connects each of the individual PDUs 110, 110', 110" to a power source 150 via a power line 180 comprising two power wires 180a, 180b (e.g. a DC+ positive rail of the DC bus and a DC– reference rail of the DC bus). Since power line communications (PLC) are utilised in this example, the communication between the PDU(s) and the power source 150 may be achieved using only the power line that connects the power source to the PDU(s) and no additional communication bus or communication wires are required. In this example the power line 180 comprising the power wires 180a, 180b, 180a', 180b', 180a", 180b' which connect to the three PDUs on this branch, although of course more or less wires could be used depending on the number of PDUs. The power lines/wires are held in place with a wire harness or harnesses 140 as shown. The size of these wire harnesses are reduced in comparison to the known system shown in FIG. 1, as less wires are used. The input connectors may also be reduced in size in comparison to the known example shown in FIG. 1, for the same reason.

In these examples, the power line 180 is therefore used both to deliver power as well as being used as the communications channel. It can be seen, when comparing FIG. 2 with FIG. 1 that in the example of FIG. 2 wherein PLC is used as the communication system, the need for the communications bus 13 has been completely eliminated. This provides advantages in that fewer wire harnesses 140 are needed and the wire harnesses 140 required to hold the wires in place can also be much lighter and smaller in size. The input connectors, 120 on the PDUs and 160 on the power source (described later) that are required to connect the power lines 180a, 180b to the power source and the PDUs may be smaller as there are less wires connected to the PDUs 110, 110', 110". Due to the fact that the power and the communications are both in the same power line 180, the installation of the system is also much simpler and the certification of the wires is much more straightforward than in known systems. In addition to all of this, since there are no communication wires present, there is no need for the additional protection circuits which would normally be required within the PDU 110 on the communication sub-circuits due to the proximity of the communication and power wires.

Figure 3:
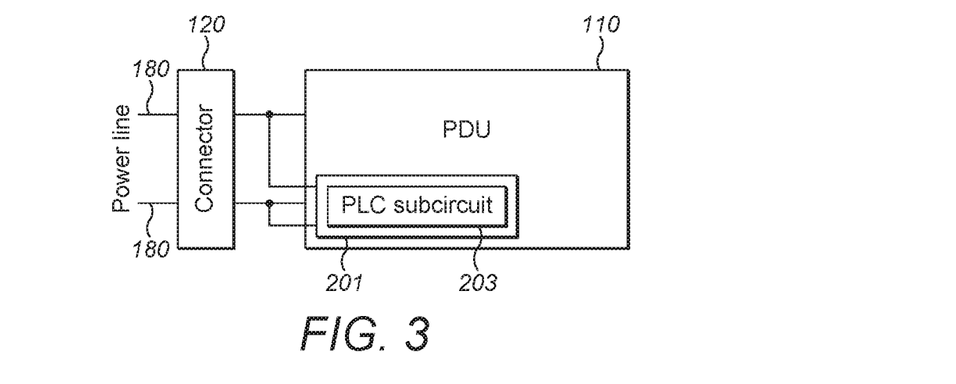
FIG. 3 depicts a block diagram showing a position of the PLC node and PLC sub-circuit when located in a PDU.
Figure 5:
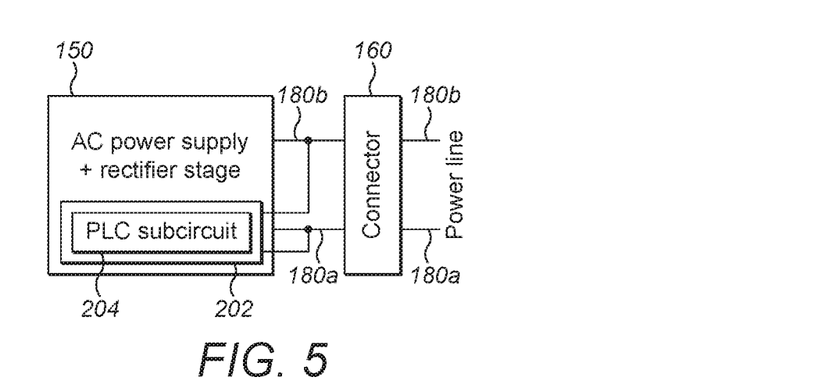
FIG. 5 depicts a block diagram showing the position of the PLC node and PLC sub-circuit when located in the power source of FIG. 2.
Figure 7:
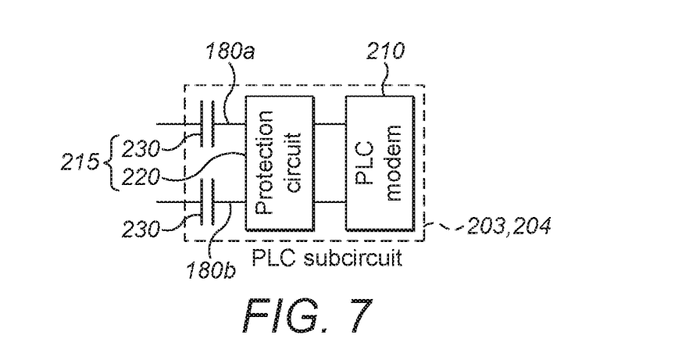
FIG. 7 depicts a block diagram showing the features of the PLC sub-circuit(s) of FIG. 2 in detail.

The system and method of communication will now be described in greater detail. PLC nodes 201, 202 as shown in FIGS. 3 and 5 comprise the PLC sub-circuits 203, 204 (as shown in FIG. 7) which enable the cargo system of a freight aircraft to use power line communications to send and exchange signals containing information such as commands (e.g. to activate the PDU and move the load) or health status signals (to indicate a problem).

The cargo system of a cargo handling system of an aircraft may be described as being a system that moves pallets (e.g. cargo boxes) in and out of the cargo bay of a cargo handling system of an aircraft. The PDUs of the system are a part of and therefore remain on the aircraft and are used for actuating the movement of the cargo. The communication systems described herein therefore do not rely on power source outside of the aircraft, nor are they intended to communicate with devices that are outside of the aircraft. The communication systems described herein may therefore be described as being contained within an aircraft.

A first PLC node 202 and corresponding sub-circuit 204 may be integrated into the power source 150 and a second PLC node 201 and corresponding sub-circuit 203 may be integrated into each of the PDUs 110, 110', 110" of any of the examples described herein with reference to FIGS. 2 to 7. For example, the PDUs may comprise an actuator box and the second PLC node (201) may be integrated in the actuator box of the PDUs. A first (i.e. command) PLC node 203 may send signals to a second or plurality of (i.e. receiving) PLC node(s) 201 and vice versa, as discussed below.

In the examples described herein, the node 202 comprising the PLC sub-circuit 204 in the power source 150 may act as the central, or command, node that sends command signals to the sub-circuit(s) 203 in the nodes 201 of the PDUs 110, 110', 110" to thereby actuate the PDU(s). This communication is bidirectional and the receiving node(s) in the PDUs 110, 110', 110" are also able to send signals back to the central node 202 in the power supply 150, for example, to provide the "health status" back to the central node 202. The "health status" signal may comprise a command that is sent from the PDU back to the central node and can comprise (amongst other information) any information regarding whether or not there are any errors in the signals in any of the PDUs, for example. In one example, if there is an overvoltage condition on one of the PDUs a signal indicating this will be sent back to the command node. All PLC nodes are therefore able to both send and receive commands/signals/information. In the examples shown in the FIGS. 2 to 7, each PDU may comprise a receiving PLC node 201 so that each PDU may receive command signals to be actuated and also send health status signals back to the central node 202 for monitoring purposes.

FIG. 7 is a block diagram depicting in detail the PLC sub-circuit 203, 204 which may be integrated with/located within the PDU 110, 110', 110" and/or the power source 150. The PLC sub-circuit 203, 204 comprises a PLC Modem 210 which creates the RF communication signals that are to be sent between the nodes 201, 202. Since the PLC modem 210 is a low voltage component and needs to be protected against abnormal operating conditions on the DC bus, a protection circuit if further provided in the PLC sub-circuit. Specifically, the PLC sub-circuits of the examples described herein may further comprise an "analogue front end" (AFE) 215 which is designed specifically for this particular application and comprises a protection circuit 220 and capacitors 230 (in this example two capacitors in each circuit, one for each wire). The modem 210 is directly connected to the protection circuit 220, which in turn is connected to the PDU or power supply 150 by wires 180a, 180b. Since galvanic isolation is required on any wire that is connecting the PLC modem 210 to the wires 180a, 180b of the power line 180, the capacitors are provided on the wires 180a, 180b that connect the protection circuit 220 to the PDU 110 or power source 150 in which the PLC sub-circuit is positioned. The protection circuit 220 is provided before the modem 210 (i.e. between the modem 210 and the power line 180) to thereby protect the modem 210 in case there is an overvoltage condition that goes through the coupling capacitors.

The capacitors 230 used in the PLC sub-circuits 203, 204 must be chosen and designed taking into account the wire type and geometry, the number and location of the PDUs 110 and the power supply 150. The AFE 215 (i.e. the coupling capacitors 230 together with the protection circuit 220) of the examples described herein is therefore designed to comply with DO-160 requirements for an aircraft. This differentiates the coupler design described herein from other coupler designs.

Figure 4:
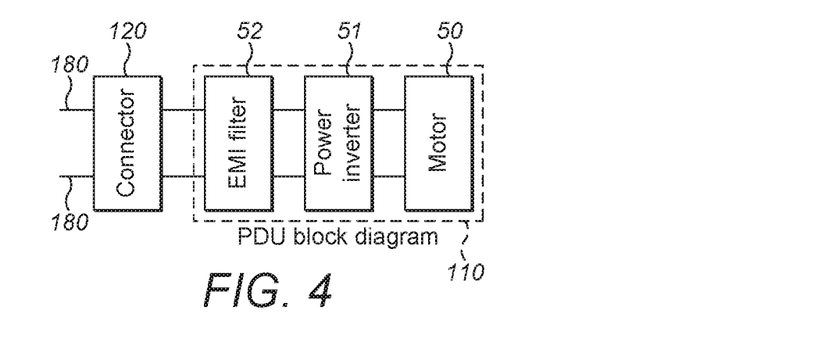
FIG. 4 depicts a block diagram showing the features of the PDU of FIG. 2 in detail.

FIG. 4 is a block diagram showing in greater detail the circuitry of a PDU 110, 110', 110" that may be used with any of the examples shown in FIGS. 2 to 7. The power supply is a DC power supply. As can be seen in this figure, a motor 50 (e.g. a three-phase electrical motor) may be connected to a DC/AC power inverter 51. Since the inverter and motor are going to generate noise, an EMI filter is provided between these components and the power line in order to avoid noise distortion to propagate upwards to the power line or to the power supply. The DC/AC power inverter 51 (i.e. the motor drive) is therefore connected to a DC EMI filter 52. The EMI filter 52 is then connected to the power wires 180a, 180b of the power line 180 via an input connector 120, 120' as shown in FIGS. 2 and 4.

FIG. 3 is a block diagram depicting in greater detail the features of one of the PDUs 110, 110', 110" of FIG. 2 and specifically where the PLC node 201 and sub-circuit 203 may be positioned/integrated if it was located within a PDU 110.

In this example, the PLC node 201 comprising the PLC sub-circuit 203 may therefore be connected to the power wires 180a, 180b of the power line 180 at, or just before the input connector 120, 120', 120". By positioning the PLC node 201 and sub-circuit 203 at the input connector 120, (in other words on the power line side of the EMI filter 52), any degradation of the communication performance that may occur if the PLC sub-circuit was positioned inwards of the PDU is thereby reduced. In this example, the PLC node is therefore positioned between the EMI filter 52 and the connector 120, 120', 120" and therefore between the EMI filter 52 of the PDU 110 and the power supply 150.

Figure 6:
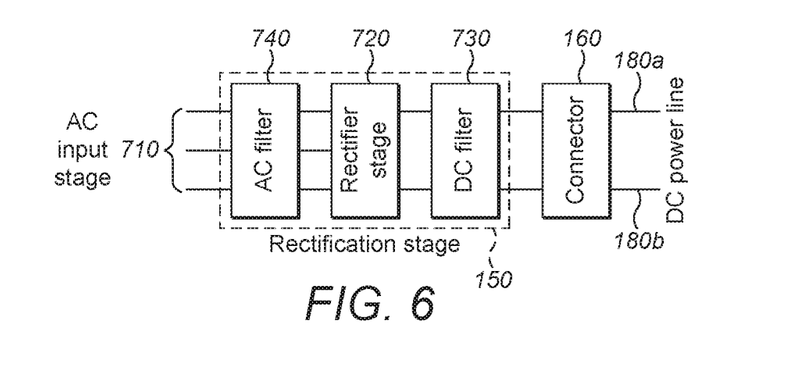
FIG. 6 depicts a block diagram showing the features of the power source of FIG. 2 in detail.

FIG. 6 is a block diagram showing the power supply 150 in greater detail that may be used with any of the examples shown in FIGS. 2 to 7. Specifically the power supply 150 may comprise an AC input source 710 connected via an AC filter 740 to a rectifier stage 720 which in turn is connected to a DC filter 730. The DC filter is then connected to the wires 180a, 180b of the DC power line 180. An output connector 160 is then provided on the power wires 180a, 180b of the power line 180.

When the main PLC node 202 comprising the PLC sub-circuit 204 is integrated into the power supply, 150, the main PLC node sub-circuit 204 in the power supply sends control commands to the receiving PLC sub-circuits 203 in the PDUs, for example, to move the cargo forward or backwards.

FIG. 5 is a block diagram depicting in greater detail the power source 150 of FIG. 2 and specifically where the PLC node 202 and sub-circuit 204 may be integrated if it was located within/in combination with the power source 150. Referring to FIGS. 5 and 6, it can be seen that the power line 180, (comprising power wires 180a, 180b) extending from the DC filter is further connected to a second connector 160, as described above. In some examples, the PLC sub-circuit may therefore be connected to the power source 150 so that it is provided on the power line 180, 180a, 180b and positioned between the DC filter 730 of the power source and the connector 160 of the power source. In some examples, the PLC node 202 may be positioned at the output connector 160 itself. By positioning the PLC node 202 in this position, (i.e. on the power line side of the power source 150), any interaction of the power supply on the communications performance is avoided. In addition to this, the impedance of the power supply may be measured at the connector point and analysed to design the capacitor type and value.

As described above, power line communications sends an RF communication signal between the PLC sub-circuits. As also described above with reference to FIG. 7, the PLC sub-circuits 203, 204 of the PLC nodes 201, 202 may therefore comprise a PLC modem 210, which will generate, receive and process the RF signal needed for the bidirectional communication. The analogue front end (AFE) of the PLC sub-circuit of the command PLC node described above then couples the signal to the power line 180. The AFE stage (i.e. the analogue components that are positioned between the modem 210 and power line 180, comprising the protection circuit 220 and coupling capacitors 230) will also filter the signal and incorporates an overvoltage protection circuit to protect the PLC modem 210.

In use, the modem 210 located in the command node (e.g. the command PLC node 202 in the power source 150) will therefore generate an RF communication signal that will be coupled to the power line 180 via the AFE 215 of the command PLC node 202. The AFE 215 on the receiver side (e.g. in the receiving PLC node 201 in the PDU 110) may then extract the signal and feed it to the modem 120 of the receiving PLC node 201 where it will be processed. The receiving PLC sub-circuits 203 in the PDUs 110, 110', 110" therefore receive the control commands and in return may send a health status message back to the main PLC node 201.

As shown in these figures and described herein, there is therefore a direct electrical connection between the power supply 150 and each of the loads (via the PDUs). This allows the transmission of the communication signals between the main PLC node 202, (which may be integrated with/located within the power supply 150 and connected to the power line 180 after the EMI filter 52) and the receiving PLC node or nodes 201 also comprising PLC sub-circuits 203 (that may be integrated with/located within the PDU 110).

As described above, there are several benefits for a cargo handling system of an aircraft in substituting the wired communication system of known systems by a PLC-based one as described with reference to FIGS. 2 to 7. Direct benefits and advantages include the fact that less cabling is required (about 800 m less in a 777 F). This therefore results in a smaller cable cross section and less weight. In addition to this, fewer, and lighter harnesses are required to hold the wires and cables in place. These benefits have a higher impact in an aircraft, where weight and volume are critical factors. A further benefit is that the input connectors 120 of the PDUs 110, 110', 110" will require less input pins which will simplify and reduce the cost of the PDU. Additionally, the reduction in cabling will decrease the installation complexity and make the certification process faster and easier. The system, therefore, will be more robust and the failure rate will be reduced.

The invention claimed is:

1. A system for sending a signal between a power source and at least one Power Drive Unit (PDU) of a cargo handling system of an aircraft, comprising:
    said power source provided within said aircraft, and
    said at least one PDU provided within said aircraft,
    said power source being capable of providing DC power to said at least one PDU via an electrical power line;
    said power source further comprising a first Power Line Communication (PLC) node;
    said at least one PDU further comprising a second Power Line Communication (PLC) node;
    said first PLC node being capable of sending said signal between said first PLC node and said second PLC node via said electrical power line, wherein said at least one PDU comprises:
    a motor:
    a DC/AC power inverter:
    a DC EMI filter; and
    an input connector; and
    wherein: said motor is connected to said DC/AC power inverter and said DC/AC power inverter is connected to said DC EMI filter; and
    wherein said DC EMI filter is connected to said electrical power line via said input connector,
    wherein said second PLC node located in said PDU is connected to said electrical power line at said input connector between said electrical power line and said DC EMI filter.

2. The system of claim 1, wherein said first PLC node comprises a first PLC sub-circuit; and
    said second PLC node comprises a second PLC sub-circuit;
    and wherein said first and second PLC sub-circuits comprise a PLC modem connected to an analogue front end (AFE).

3. The system of claim 2, wherein said AFE comprises:
    a protection circuit; and
    coupling capacitors; and wherein:
    said PLC modem is connected to said protection circuit, and said protection circuit is connected, via said coupling capacitors, to said electrical power line.

4. The system of claim 3, wherein said electrical power line comprises first and second power wires and wherein one of said coupling capacitors is connected to each of said power wires.

5. The system of claim 2, wherein said AFE complies with DO-160 requirements for said aircraft.

6. The system of claim 1, wherein said power source is connected to an AC input source, and wherein said power source comprises:
    an AC filter;
    a rectifier stage;
    a DC filter; and
    an output connector and wherein:
    said AC filter is capable of receiving an AC current from said AC input source; and wherein:
    said AC filter is connected to said rectifier stage, said rectifier stage is connected to said DC filter and said DC filter is connected to said electrical power line via said output connector.

7. The system of claim 6, wherein said first PLC node is located between said DC filter and said output connector.

8. The system of claim 1, wherein the first PLC node is located within the power source and is capable of sending a command signal to the second PLC node located in the at least one PDU to actuate said at least one PDU.

9. The system of claim 1, wherein a communication between the first PLC node and the second PLC node is bidirectional and the second PLC node is located within the at least one PDU and is capable of sending a return signal back to the first PLC node that is located within the power source.

10. The system of claim 1, further comprising a plurality of said PDUs and wherein said first PLC node is capable of individually communicating via said electrical power line with each of said plurality of PDUs.

11. The system of claim 10, wherein said electrical power line comprises a plurality of branches and wherein at least one of said branches comprises at least one PDU.

12. A method for sending a signal between a power source and at least one Power Drive Unit (PDU) of a cargo handling system of an aircraft; said method comprising:
    connecting a first Power Line Communication (PLC) node to said power source;
    connecting a second Power Line Communication (PLC) node to said at least one PDU; and providing DC power from said power source to said at least one PDU via an electrical power line;
    said first PLC node being capable of communicating with said second PLC node via said electrical power line, and sending said signal between said first PLC node and said second PLC node via said electrical power line, wherein said at least one PDU comprises:
    a motor:
    a DC/AC power inverter;
    a DC EMI filter; and
    an input connector; and
    wherein: said motor is connected to said DC/AC power inverter and said DC/AC power inverter is connected to said DC EMI filter; and
    wherein said DC EMI filter is connected to said electrical power line via said input connector, wherein said second PLC node located in said PDU is connected to said electrical power line at said input connector between said electrical power line and said DC EMI filter.

13. The method of claim 12, further comprising providing a first PLC sub-circuit in said first PLC node and providing a second PLC sub-circuit in said second PLC node and further comprising providing a PLC modem connected to an analogue front end (AFE) in each of said PLC sub-circuits, wherein said AFE comprises:

a protection circuit; and capacitors; and said method further comprising connecting said modem to said protection circuit and connecting said protection circuit to said electrical power line via said capacitors.

* * * * *